United States Patent [19]

Primus

[11] 4,175,872
[45] Nov. 27, 1979

[54] METHOD AND MEANS FOR AGITATING LIQUID MANURE

[76] Inventor: David R. Primus, Mt. Auburn, Iowa 52303

[21] Appl. No.: 946,827

[22] Filed: Sep. 28, 1978

[51] Int. Cl.² .......................... B01F 13/06; B01F 15/02
[52] U.S. Cl. ..................................... 366/139; 366/154; 366/159; 406/152
[58] Field of Search ............... 366/139, 154, 159, 336, 366/337, 338, 339, 340, 133, 131; 302/58, 15; 15/415, 1.7

[56] References Cited

U.S. PATENT DOCUMENTS

| 1,741,019 | 12/1929 | Harrington | 366/338 |
| 2,068,496 | 1/1937 | Linghammar | 15/415 |
| 2,740,616 | 4/1956 | Walden | 366/336 |
| 3,754,580 | 8/1973 | Perry | 15/1.7 |
| 4,026,817 | 5/1977 | Ciuti | 366/338 |

*Primary Examiner*—Robert W. Jenkins
*Attorney, Agent, or Firm*—Zarley, McKee, Thomte, Voorhees & Sease

[57] ABSTRACT

The adapter for the liquid manure vacuum agitator of the present invention comprises an elongated cylindrical tubular member having opposite ends and an internal annular bore defined by the interior cylindrical wall of the tubular member. A continuous spiraling blade is attached to the interior of the cylindrical wall, the blade having sufficient width to extend partially radially inwardly to terminate in an inner end which is spaced axially outwardly from the centerline of the tubular member, thereby giving an open center through the tubular member along the longitudinal centerline thereof. The spiraling blade causes agitation of the manure as it is forced through the tube.

10 Claims, 7 Drawing Figures

METHOD AND MEANS FOR AGITATING LIQUID MANURE

BACKGROUND OF THE INVENTION

The present invention relates to a method and means for agitating liquid manure. In recent years agricultural businesses have utilized confinement feeding operations for hogs, cattle and other livestock. These confinement systems include an enclosed building having slatted floors through which the animal waste is permitted to drop. The animal waste is collected in pits below the floor.

Periodically the animal waste is pumped from the pits into a spreader wagon having a tank for carrying the mixture of solid and liquid waste. From the tank the waste is sprayed or dispersed onto agricultural fields for fertilizing the fields. One problem encountered with present devices is the necessity for agitating the mixture of solid and liquid waste so that the solid waste will be dispersed throughout the liquid waste. There is a strong tendency for the solid waste to settle both in the pit and also in the tank after the material has been pumped into the tank. Agitation is necessary to help keep the solid materials dispersed in the fluid.

Another problem is encountered by virtue of the settling of the solid waste to the bottom of the pit. A layer of solid waste develops in the bottom of the pit and periodically the pit must be drained and the bottom of the pit cleaned from solid waste.

SUMMARY OF THE INVENTION

The present invention utilizes a tubular member which is mounted at the end of a hose connected to the spreader tank. The tube includes on its inner surface a helical flighting which extends in a spiral path around the interior cylindrical wall of the tube. The helical flighting is open adjacent the longitudinal centerline of the tube so that an opening is provided for the larger solids within the fluid.

As the fluid is pumped through the tube, the flighting imparts an agitation to the fluid so as to cause the solids to be dispersed evenly throughout the fluid. The opening along the centerline of the tube permits the larger particulate materials to pass through the tube with a minimum of blockage or clogging of the tube.

One modification of the present invention utilizes fingers which are of a spiral configuration to facilitate the ease with which they may be dug into the settled particulate materials at the bottom of the pit.

Therefore, a primary object of the present invention is the provision of an improved method and means for agitating liquid manure.

A further object of the present invention is the provision of a method and means which permits the agitation of liquid manure while at the same time permitting the passage of particulate materials in the manure through the hose to the liquid manure tank.

A further object of the present invention is the provision of a device which makes possible the loosening and dispersement of settled solid particles at the bottom of the liquid manure pit.

A further object of the present invention is the provision of a device which is economical to manufacture, durable in use and simple in construction.

DETAILED DESCRIPTION OF THE DRAWINGS

Figure 1:
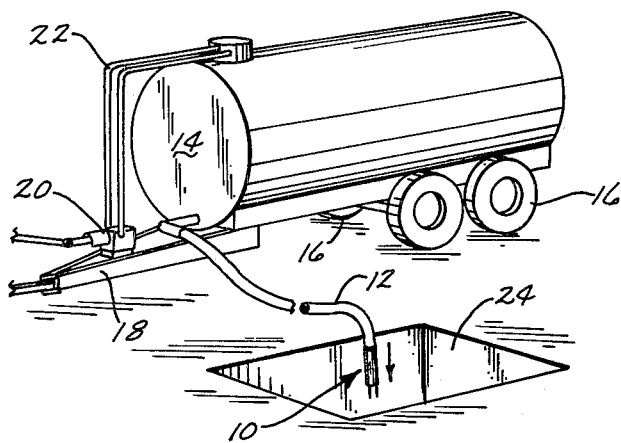
FIG. 1 is a pictorial view of the present invention utilized on the end of a hose.
Figure 2:
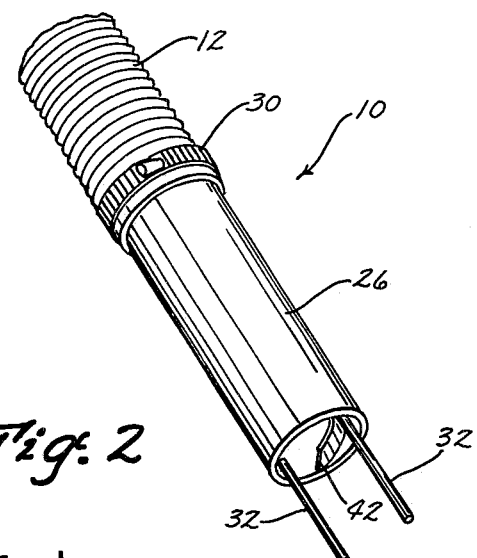
FIG. 2 is an enlarged pictorial view of the present invention mounted on the end of a hose.

Referring to the drawings, the numeral 10 generally designates the adapter of the present invention. In FIG. 1 adapter 10 is shown connected to a hose 12 which in turn is connected to a spreader tank 14. Tank 14 is mounted on a wheel carriage 16 and includes a tongue 18 adapted to be mounted to a tractor or other device for pulling the wagon.

A pump 20 is mounted on tongue 18 and is in communication with the interior of tank 14 by means of conduits 22. Pump 20 is adapted to operate to apply pressure to the interior of tank 14 or alternatively to apply vacuum to the interior of tank 14. By applying pressure it is possible to pump the contents of the tank outwardly through hose 12. By applying a vacuum to the interior of tank 14, it is possible to suck liquid manure from a pit 24 upwardly through hose 12 into the interior of tank 14.

Adapter 10 comprises a tubular member 26 having an inner cylindrical surface 28 therein. Hose 12 slips over one end of tube 26 and is clamped thereto by means of a clamp 30. A pair of fingers 32 are attached to the other end of tubular member 26 and protrude axially therefrom.

Attached to the interior cylindrical surface 28 of tubular member 26 is a helical flighting 34. Flighting 34 includes an outer edge 36 which is welded or otherwise secured to cylindrical inner wall 28. Flighting 34 has an inner edge 38 which protrudes radially inwardly within tubular member 26, but which terminates in spaced relation to the longitudinal axis of tubular member 26 so as to create a central opening 40 therein as viewed from the end of tubular member 26. The ends of helical flighting 34 are tapered at 42 so as to minimize the likelihood that particles will be caught or hindered in any way from passage through tubular member 26.

The revolutions of flighting 34 per lineal unit vary along the length of tubular member 26. Adjacent the open end of member 26 the flightings are farther apart and the revolutions per lineal unit are less. However, the flightings become closer together adjacent hose 12 and the revolutions of flighting 34 per lineal unit are greater than at the open end of tubular member 26. This minimizes the clogging of tubular member 26 as the particles first enter therein, and gradually causes increased agitation of the liquid manure as it progresses through the tubular member 26. If the primary goal is to increase spin at entrance, the revolutions of flighting 34 may be tighter at the entrance end of tubular member 26 than at the end adjacent to hose 12. Of course, evenly spaced flighting throughout member 26 also may be employed, the precise configuration depending upon the availability and desired result.

The width of flighting 34 may vary without detracting from the invention, but the preferred width is approximately one-fourth to one-sixth of the diameter of the tube. This permits opening 40 to be of sufficient size that blockage does not occur.

Figure 3:
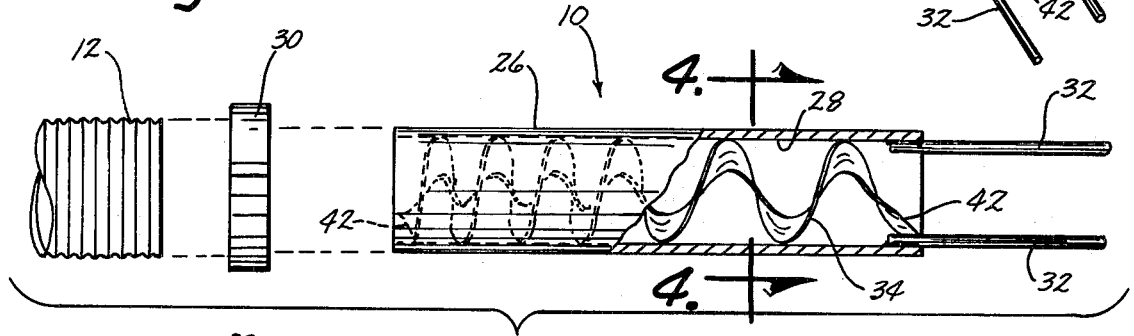
FIG. 3 is a side elevational view showing in exploded arrangement the hose, the adapter of the present invention and the coupling for mounting the adapter to the hose. The adapter is partially broken away to show the interior thereof.
Figure 4:
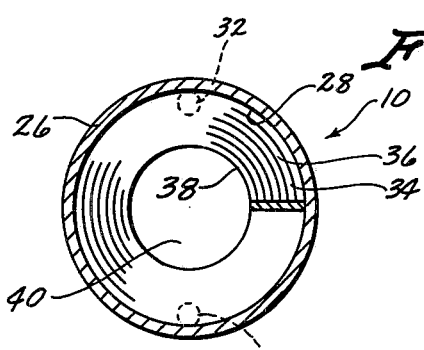
FIG. 4 is a sectional view taken along line 4—4 of FIG. 3.
Figure 5:
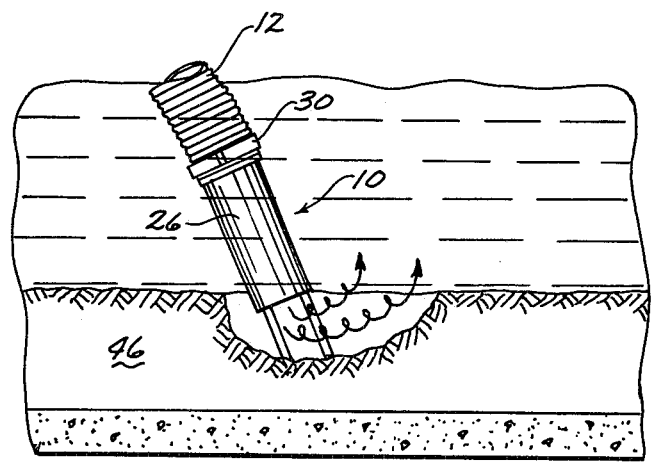
FIG. 5 is a side elevational view showing the adapter of the present invention as it is used at the bottom of a liquid manure pit.
Figure 6:
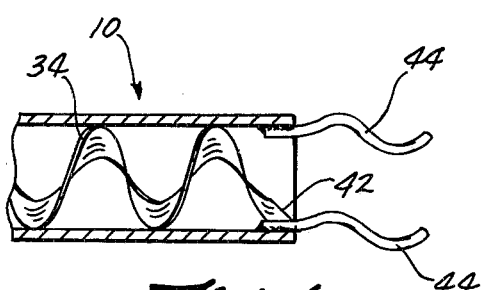
FIG. 6 is a side sectional view of the adapter of the present invention utilizing a modified form of spiral fingers thereon.

Referring to FIG. 6, a modified form of the present invention comprises the use of spiral shaped fingers 44 in the place of straight fingers 32 shown in FIG. 3.

In operation, the adapter 10 is inserted into pit 24 towards the bottom of the pit, and a vacuum is applied to the interior of tank 14 by means of pump 20. This causes the liquid mixture within the pit to be sucked into the open end of tubular member 26. As the material is forced through tubular member 26, a swirling action is imparted thereto by means of flightings 34. Opening 40 permits the larger particles within the manure mixture to pass through conduit 26 without clogging. The material then passes through hose 12 into tank 14. Fingers 32 (or spiral fingers 44 as shown in FIG. 6) are used to dig into and break up the settled sludge material 46 which has accumulated at the bottom of pit 24. After all the liquid material has been removed from pit 24, there may still remain some sludge material 46 at the bottom thereof. This may be additionally loosened by reversing pump 20 and forcing the material out of tank 14 through hose 12 and conduit 26 back into pit 24. The conduit 26 is placed in such a position that the fluid exiting from conduit 26 is forced against the sludge 46 in the bottom of the pit. As the liquid is forced through conduit 26, a swirling action is imparted thereto, and the fluid is in a very agitated and swirling state as it exits from conduit 26. This agitation of the fluid as well as the sludge returning with the fluid in slurry form as it exits from conduit 26 further facilitates the loosening and dispersal of the sludge 46 in the fluid within pit 24 so that both can be removed.

In view of the foregoing, it can be seen that sludge 46 may be loosened and dispersed in the fluid merely by pumping the fluid back and forth between pit 24 and tank 14 until satisfactory dispersal is attained.

Figure 7:
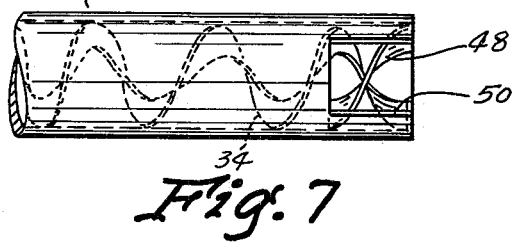
FIG. 7 is a side elevation view of a second embodiment of the invention.

In FIG. 7 an alternative embodiment is shown. Fingers 44 are not employed but rather the adapter cylindrical well 26 has an opening 50 adjacent its discharge end. This prevents vacuum suction shut off against the pit walls in much the same manner as do fingers 44. Additionally, spin and thrust of slurry as it enters and/or exits is enhanced by reverse flight 48 which protrudes part way into tubular member 46. It is also possible, if desired to employ a second port opening 50 and flight 48 on the opposite side of tube 46 to further enhance the agitation action.

What is claimed is:

1. An adapter for a liquid manure vacuum agitator having a tank, a hose connected to said tank at one end and having a free end, and means for applying a vacuum to said hose for collecting a manure water mixture through said free end; said adapter comprising:
   an elongated cylindrical tubular member having opposite ends and an internal annular bore defined by the interior cylindrical wall of said tubular member;
   a continuous spiraling blade attached to said interior cylindrical wall said spiraling blade having sufficient width to extend radially inwardly from said cylindrical wall to an inner edge which is spaced from axial centerline of said tubular member, thereby leaving an open center through said tubular member along said longitudinal centerline thereof; and
   means for connecting one end of said tubular member to said free end of said hose.

2. An adapter according to claim 1 comprising a pair of fingers attached to the other end of said tubular member and protruding axially beyond said other end of said tubular member.

3. An adapter according to claim 2 wherein said fingers are elongated and are helical in shape.

4. An adapter according to claim 1 wherein said spiral blade has a width which is between one-fourth to one-sixth that of the diameter of said interior cylindrical wall.

5. An adapter according to claim 1 wherein the distance between each revolution of said blade is greater adjacent said other end than the distance between each revolution adjacent said one end connected to said hose.

6. An adapter according to claim 1 wherein said tubular member has a port opening adjacent one of its ends.

7. An adapter according to claim 6 wherein said tubular member has at least one reverse helical flight associated with said port opening.

8. An adapter according to claim 1 wherein the distance between each revolution of said blade is greater adjacent said one end connected to said hose than the distance between each revolution adjacent said other end.

9. A method for agitating liquid manure comprising;
   inserting the distal end of a hose having an elongated tubular member thereon into a reservoir of liquid manure;
   applying a vacuum to said hose whereby said liquid manure is drawn into and through said tubular member and said hose;
   agitating said liquid manure as it passes through said tubular member by means of spiral flighting extending in a helical path around the interior surface of said tubular member, said spiral flighting only partially filling the annular bore extending through said tubular member to leave an open center for permitting passage of larger solid particles through said tubular member; and
   carrying said agitated liquid manure through said hose to a second reservoir.

10. A method according to claim 9 comprising pumping said agitated liquid manure from said second reservoir through said hose and said tubular member and back into said first mentioned reservoir whereby said liquid manure will again be agitated as it passes through said tubular member and is swirled by said flighting on the interior thereof.

* * * * *